3,755,429
PROCESS FOR THE PREPARATION OF SULFONATED DETERGENT COMPOSITION

Herbert C. Smitherman, Cincinnati, Ohio, assignor to The Procter & Gamble Company, Cincinnati, Ohio
No Drawing. Oct. 12, 1971, Ser. No. 188,590
Int. Cl. C07c 143/02
U.S. Cl. 260—513 R                              11 Claims

ABSTRACT OF THE DISCLOSURE

A process for preparing a water-soluble sulfonated reaction product having excellent detergent properties which uses alpha-olefins as the starting reactant. The process comprises, as the first step, reacting each mole of alpha-olefin with 1.0 to 1.25 moles sulfur trioxide in a film reactor under process conditions of a reaction time of between 12 seconds and 50 seconds, a temperature of 32° F. to 180° F., and a pressure of 8 p.s.i.g. to 20 p.s.i.g. at the top of the reactor. This reaction mix is thereafter immediately reacted with a lower alcohol and is then neutralized and hydrolyzed to produce a valuable detergent composition.

BACKGROUND OF THE INVENTION

This invention relates to an improved process for the preparation of an organic water-soluble sulfonated reaction product which has valuable detergent properties and is thus useful as a detergent composition.

While sulfonated detergent compounds and processes for their preparation have been known and used for many years, there is a continuing need and demand for improved processes and products. Few of the known processes have been completely successful in meeting the rigid requirements of economics and performance results imposed by the soap and detergent industry. For instance, while some sulfonation processes claim to provide detergent products of high quality, they are generally difficult to control and are inordinately costly. The products of these reactions are frequently expensive, as a result of which, such processes have not found wide commercial acceptance in the industry since the economic factor is so important. Yet other processes, which reputedly solve the problem of cost, are subject to the objection that they produce reaction products of generally inferior quality. Still other known processes have limitations in that while they offer quality products at a reasonable cost, they cannot be scaled up to satisfy production line requirements of a uniform high quality product.

Accordingly, it is a primary and major object of the present invention to provide an improved process for the preparation of an organic water-soluble sulfonated reaction product which has outstanding detergent properties. Another object is to provide such an improved process which is inexpensive and which also is easy to perform. A further object of the present invention is to provide a process for the conversion of alpha olefin hydrocarbons into valuable detergent compositions, which process can be readily scaled up to factory requirements with a minimum of effort and without an adverse effect on cost factors or sacrifice to the uniform high quality of the reaction product. Yet another object of the present invention is to provide an inexpensive, continuous process for the preparation of a sulfonated alpha olefin reaction product having valuable detergent properties. Other objects will become apparent from the following detailed description of the present invention.

All percentages used hereinafter in the specification and claims are by weight unless otherwise specified.

SUMMARY OF THE INVENTION

A process for preparing a water-soluble sulfonated reaction product, comprising the steps of:

(a) Reacting an alpha-olefin containing from 10 to 20 carbon atoms with sulfur trioxide in a film reactor at a temperature of from 32° F. to 180° F., a pressure at the top of reactor of from 8 p.s.i.g. to 20 p.s.i.g., a reaction time of from 12 seconds to 50 seconds and wherein from 1.0 mole to 1.25 moles of the sulfur trioxide is reacted with each mole of the alpha-olefin to produce a sulfonated mix;

(b) Immediately reacting the sulfonated mix of step (a) with a lower alcohol having from 1 to 4 carbon atoms;

(c) Neutralizing the product of step (b) with an alkali solution; and (d) Hydrolyzing the product of step (c) to obtain the water-soluble sulfonated reaction product comprising the water-soluble salts of from 40% to 55% alkene-1-sulfonate, from 20% to 40% of 2-alkoxy alkane-1-sulfonate wherein the alkoxy radical contains from 1 to 4 carbon atoms, from 10% to 20% of 3- and 4-hydroxy alkane-1-sulfonate, and from 2% to 15% of alkene disulfonate wherein the sulfonated chains all have from 10 to 20 carbon atoms.

DETAILED DESCRIPTION OF THE INVENTION

The process of this invention results in a very efficient detergent composition having use per se or as part of a built detergent formulation. In particular the resultant product of this novel process consists essentially of from 40% to 55% of a water-soluble salt of alkene-1-sulfonate, from 20% to 40% of a water-soluble salt of 2-alkoxy alkane-1-sulfonate wherein the alkoxy radical contains from 1 to 4 carbon atoms, from 10% to 20% of the water-soluble salts of 3- and 4-hydroxy alkane-1-sulfonate, and from 2% to 15% of a water-soluble salt of an alkene disulfonate wherein one sulfonate radical is attached to a terminal carbon atom and the other sulfonate radical is attached to a carbon atom not more than three carbon atoms removed from the said terminal carbon atom. All of the above aforementioned compounds have sulfonated chains containing from 10 to 20 carbon atoms. Additionally, the alkene double bond of the alkene-1-sulfonate and alkene disulfonate is distributed between the terminal carbon atom having attached thereto the sulfonate radical and the fifth and seventh carbon atoms, respectively. A detailed description of the end product of the process of this invention will be more fully described hereinafter. Commonly assigned concurrently filed herewith copending patent application Ser. No. 188,597, entitled "Detergent Composition" by Herbert C. Smitherman, also contains a description of the detergent composition that represents the end product of this invention.

The sulfonation reaction of the present invention is carried out in a thin film reactor. Various film sulfonation processes are generally known to those skilled in the art as well as apparatus for carrying out the process. For example, U.S. Pat. 3,531,518, Ohren et al., describes apparatus and a process for film sulfonation of an alpha-olefin reactant.

If the sulfonation reaction is carried out under certain conditions specified hereinafter, there will be obtained a reaction mix that can be converted to a valuable detergent composition. That is, if the sulfonated reaction mix is immediately reacted with a lower alcohol and then neutralized and hydrolyzed under reaction conditions fully set out hereinafter, there results a detergent composition that performs eminently well per se or when combined with a builder salt in a built detergent composition.

More particularly, in the sulfonation step of the invention, an alpha-olefin is formed into a thin flowing film on the heat exchange surface of the film reactor. This film is contacted with gaseous sulfur trioxide to produce a substantially complete reaction between the reactants to form a reaction mixture that is thereafter converted into a desirable detergent product.

The alpha-olefins that are used are derived from any convenient process, for example, wax cracking, ethylene buildup and by dehydrating the primary alcohols obtained by hydrogenating fatty acids or their esters, e.g. those obtained from palm oil, tallow, coconut oil and olive oil. Vinylidene branching occasionally occurs as a by-product in some preparative methods. The present invention can tolerate amounts of vinylidene branched olefins and internal olefins in the starting material up to levels of 15% by weight, or even more. Although these by-products do not interfere with the sulfonation reaction, it is nevertheless a preferred embodiment of the present invention to run the sulfonation reaction with alpha-olefins wherein the vinylidene branched in internal compounds are held to a minimum, i.e. below 10% by weight.

Alpha-olefins which can be used in the present invention include 1-decene, 1-undecene, 1-dodecene, 1-tridecene, 1-tetradecene, 1-pentadecene, 1-hexadecene, 1-heptadecene, 1-octadecene, 1-nonadecene and 1-eicosene. Mixtures of these compounds can also be used.

The sulfur trioxide sulfonating agent used in the present invention is used as a gas reactant. It is used with a diluent such as any of the commonly used inert materials, e.g. nitrogen, air, etc. The volumetric ratio of diluent to sulfur trioxide should be in the range of from 10:1 to 100:1, and preferably within a range of 15:1 to 75:1.

Preferably the sulfur trioxide sulfonating agent of this invention is uncomplexed. A complexed sulfur trioxide reactant can be used in the present invention, but is normally avoided due to the need to later remove the complexing agent. Failure to remove the complexing agents commonly used can result in a detergent composition that does not perform properly. If the particular complexing agent being employed with the sulfur trioxide does not hamper the present process, affect the detergency performance of the end product or can be removed, such complexed sulfur trioxides can be used.

The proportions of the sulfur trioxide sulfonating agent to the alpha-olefin raw material employed in carrying out the sulfonation reaction can very within relatively wide limits ranging from less than stoichiometric amounts to stoichiometric amounts, to an excess of the sulfonating agent. It is perferred, however, to run a sulfonation reaction in which at least a stoichiometric amount of sulfonating agent is used. The molar amount of sulfonating agent can range from 0% to 25% and, preferably from 10% to 20% of the sulfonating agent, over the alpha-olefin. That is, the molar ratio of varorous sulfur trioxide to alpha-olefin should be from 1.0:1 to 1.25:1. The preferred molar ratio is from 1.1:1 to 1.2:1.

In addition to the respective amounts of sulfur trioxide and olefin hydrocarbon employed, the rate of mixing the gaseous uncomplexed sulfur trioxide sulfonating agent and the liquid alpha-olefin is also important. For the thin film sulfonation process of this invention, a range for the addition should be between 0.3 to 0.7 pound of sulfur trioxide per pound of liquid olefin per minute. If less than the prescribed rates are used, the reaction will require an inordinately long time resulting in a deterioration in the color of the sulfonated acid mix and higher levels of unreacted starting olefin. If the prescribed rates are exceeded, the composition of the desired olefin sulfonation reaction product will be altered and the color will be adversely affected due to the tendency of having localized high concentrations of sulfur trioxide.

The temperature at which the sulfonation reaction takes place depends largely on the nature of the reactants and the different processing systems which can be employed. Under ordinary conditions, however, the sulfonating temperatures can range from 32° F. to 180° F. but should preferably be within the range of 45° F. to 100° F. At temperatures below 32° F., problems can arise involving the solidification of the starting alpha-olefin raw materials together with other problems which may require special apparatus. Allowing the temperature to exceed 180° F. causes a discoloration and generally inferior reaction product.

The length of time for conducting the sulfonation reaction varies over a relatively short time range. In order to achieve the desired balance of components in the end product reaction mix the time of reaction in the sulfonation reaction must be from 12 seconds to 50 seconds, preferably from 15 seconds to 30 seconds. Reaction times in excess of 50 seconds will cause the formation of excess disulfonates and alkene-sulfonates which in turn adversely affects the performance characteristics of the detergent composition. A reaction time of less than 12 seconds is undesirable because of the resultant high percentage of unreacted olefins in the sulfonation reaction mix and consequent poor detergent composition produced therefrom. As a result of conducting the sulfonation reaction at the above specified times and other stated conditions and thereafter processing the sulfonated reaction mix as hereinafter discussed there is obtained a composition containing a blend of components eminently satisfactory as a detergent composition.

The pressure used in the sulfonation reaction can vary over a wide range. Preferably 8 p.s.i.g. to 20 p.s.i.g. pressure is employed in the top of the film reactor. The pressure at the bottom or outlet end of the thin film reactor will be less than the above noted pressure—the amount being dependent on the length of the reactor, temperature, and reactant flow rates. Most preferably the pressure at the top of the reactor is maintained between 8 p.s.i.g. and 14 p.s.i.g.

The acid reactant mix obtained at the bottom of the thin film reactor at the above process conditions is immediately dropped into another reactor container where it comes into contact with a lower alcohol, i.e. an alcohol having from 1 to 4 carbon atoms. Examples of such alcohols are methanol, ethanol, n-propanol, isopropanol, n-butanol and isobutanol. The time between the sulfonation step and contact with the alcohol is quite critical to obtaining the end product desired by the process of this invention. That is, if more than 5 seconds elapse between sulfonation and alcohol contact, the end product composition will consist of an excess of disulfonate and alkene sulfonate. Another drawback encountered when the elapsed time between sulfonation and alcohol contact is greater than about 5 seconds is the fact that an undesired dark-colored product will be obtained. Preferably as little time as possible elapses between the end of the sulfonation reaction and initial contact with the lower alcohol. This is accomplished most efficiently by allowing the sulfonation reaction mix to drop directly into a reactor mix containing the lower alcohol.

The lower alcohol and sulfonated acid mix is allowed to react for from 5 min. to 60 min. at 32° F. to 150° F. Preferably the reaction is carried out for 15 min. to 30 min. at 70° F. to 105° F. On a molar basis, the alcohol to sulfonated reaction mix is from 1.5:1 to 20:1. Preferably 8 to 10 moles of lower alcohol is present for each mole of sulfonated reaction mix.

The above reaction mix is next neutralized by the addition of an aqueous alkali solution. The temperature of the alkali solution mix is not critical since the neutralization reaction will occur readily over a broad temperature range. The aqueous alkali solution consists of any strongly basic compound such as sodium, potassium and ammonium hydroxide, the corresponding oxides, carbonates, mono-, di-, tri- and tetraethanolamine or substituted ammonium hydroxides. Other alkali solutions will be apparent to those skilled in the art. The amount of alkali employed in this step ranges from 1 to 1.2 moles alkali per mole of reaction mix.

The neutralized product is next subjected to hydrolyzing temperatures of 70° F. to 350° F. in order to convert the neutralized product to the desired detergent composition. Fifteen minutes to 72 hrs. at atmospheric pressure up to 120 p.s.i.g. and the above temperatures is sufficient for purposes of this invention. Preferably, the product of the neutralization step is hydrolyzed at a temperature of 200° F. to 300° F. for from 15 min. to 20 min. Preferably a pressure range of from 100 p.s.i.g. to 120 p.s.i.g. is employed in the hydrolyzing step at the above preferred temperature and time conditions. Failure to perform the above hydrolyzing step results in a composition possessing inferior detergency properties.

As a result of the above process, a very excellent detergent composition is obtained. By maintaining the above process conditions a detergent composition of the following formulation is obtained:

(a) From 40% to 55% of a water-soluble salt of alkene-1-sulfonate containing from 10 to 20 carbon atoms wherein the alkene double bond is distributed between the terminal carbon atom having attached thereto the sulfonate radical and the fifth carbon atom;

(b) From 20% to 40% of a water-soluble salt of 2-alkoxy-alkane-1-sulfonate containing from 10 to 20 carbon atoms in the alkane chain and from 1 to 4 carbon atoms in the alkoxy radical;

(c) From 10% to 20% of the water-soluble salts of 3- and 4-hydroxy alkane-1-sulfonate containing from 10 to 20 carbon atoms; and (d) From 2% to 15% of a water-soluble salt of alkene disulfonate wherein the compound has from 10 to 20 carbon atoms, one sulfonate radical attached to a terminal carbon atom and the other sulfonate group attached to a carbon atom not more than three carbon atoms removed from the said terminal carbon atom and the alkene double bond distributed between said terminal carbon atom and the seventh carbon atom.

Examples of cations that form the water-soluble salts are alkali metals, e.g. sodium and potassium, ammonium and substituted ammonium compounds, e.g. trialkylammonium and trialkylolammonium compounds. Specific examples of substituted ammonium compounds are mono-, di-, tri- and tetraethylammonium, mono-, di-, tri- and tetramethylammonium, and mono-, di-, tri- and tetraethanolammonium.

The following example is illustrative of the process of the invention:

Example I

An alpha-olefin having an average carbon chain length of 16 carbon atoms was fed to a film reactor at a rate of 0.49 pound per minute. The film reactor was 6 feet in length and had an inside diameter of about 0.9 inch. Cooling water having an entering temperature of about 43° F. and an exit temperature of about 45° F. was passed through a water jacket surrounding the reactor. A mixture of sulfur trioxide and air (5% sulfur trioxide on a volumetric basis) was passed into the reactor at the rate, on a sulfur trioxide basis, of 0.19 pound per minute. This represented a molar ratio of sulfur trioxide to olefin of about 1.08:1. The pressures at the reactor inlet and outlet were 12.0 p.s.i.g. and 3.8 p.s.i.g., respectively The reidence time of the reactants in the film reactor was about 20 seconds. Approximately 96% of the olefin was sulfonated. The sulfonated mix was dropped directly from the film reactor to a gas/liquid separator to remove excess sulfur trioxide and air. The gas/liquid separator was provided with a quantity of methanol in its lower portion. The elapsed time of the sulfonated mix to go from the film reactor to contact with the methanol was about two seconds. 0.55 pound per minute of methanol was added to the separator-corresponding to a methanol to sulfonated reaction mix ratio of about 8:1 on a molar basis. The resultant mix was allowed to react for about 30 min. at 110° F. Thereafater, the sulfonate-methanol reaction product was neutralized with NaOH on a molar basis of 1.1 moles of NaOH per mole of reacted sulfonate. The neutralization was carried out at a temperature of about 144° F. The neutralized product was next sent to a hydrolyzer where under conditions of a temperature of 230° F. a pressure of 112 p.s.i.g., and a time of 17 minutes, a paste was obtained that contained the detergent composition of this invention. The paste of this process contained about 33.5% by weight detergent composition. This detergent composition when analyzed contained on a weight basis about 48% sodium hexadecene-1-sulfonate, 34% sodium 2 - methoxy-hexadecane-1-sulfonate, 11% sodium 3- and 4-hydroxy hexadecane-1-sulfonate, about 5% sodium hexadecene disulfonate, and the balance comprising sodium sulfate and sodium methyl sulfate.

Example II

The process of Example I was repeated with the exception being that (1) the sulfonation was carried out in a nine foot film reactor having a pressure at the top and bottom of the reactor of 8 p.s.i.g. and 0 p.s.i.g., respectively and a time of reaction of about 28 seconds and (2) the hydrolysis was conducted at atmospheric pressure for about 2 hours at about 150° F. Approximately 87% of the olefins were converted. The final composition contained about 50% sodium hexadecene-1-suulfonate, 23% sodium 2-methoxy hexadecane-1-sulfonate, 19% sodium 3- and 4-hydroxy hexadecane-1-sulfonate, 6% sodium hexadecene disulfonate and the balance comprising sodium sulfate and sodium methyl sulfate.

Example III

Example I was repeated with the exception that reaction temperatures of 100° F. and 70° F. were used in the sulfonation and methanol reactions, respectively. About 97% of the olefins were sulfonated. The final composition contained about 51% sodium hexadecene-1-sulfonate, 26% sodium 2-methoxy hexadecane-1-sulfonate, 18% sodium 3- and 4-hydroxy hexadecane-1-sulfonate, 3% sodium hexadecene disulfonate and the balance comprising sodium sulfonate and sodium methyl sulfate.

Example IV

Example I was repeated except for carrying out the sulfonation reaction at 140° F. and the methanol reaction at 70° F. Approximately 96% of the olefins were sulfonated. The composition of the final product was as follows: 47% sodium hexadecene-1-sulfonate, 35% sodium 2-methoxy hexadecane-1-sulfonate, 15% sodium 3- and 4-hydroxy hexadecane-1-sulfonate, 2% sodium hexadecene disulfonate, and the balance sodium sulfate and sodium methyl sulfate.

Example V

The process of Example IV was repeated except for using a methanol reaction of 32° F. The final composition contained 47% sodium hexadecene-1-sulfonate, 37% sodium 2-methoxy hexadecane-1-sulfonate, 13% sodium 3- and 4-hydroxy hexadecane-1-sulfonate, 2% sodium hexadecene disulfonate, and the balance sodium sulfate and sodium methyl sulfate.

Example VI

When Example I was repeated increasing the sulfur trioxide to olefin ratio to 1.22 to 1 and keeping the other parameters constant, the following detergent composition was obtained: about 46% sodium hexadecene-1-sulfonate; about 26% sodium 2-methoxy hexadecane-1-sulfonate; about 16% sodium 3- and 4-hydroxy hexadecane-1-sulfonate; about 11% sodium hexadecene disulfonate; and the balance comprising minor impurities.

Example VII

An alpha-olefin having an average carbon chain length of 12.8 carbon atoms was sulfonated in essentially the same manner as the olefin of Example I. The difference in the processes besides the different alpha-olefin was that in this process, the mixture of sulfur trioxide and air was passed into the reactor at the rate, on a sulfur trioxide basis, of 0.23 pound per minute. This represented a molar ratio of sulfur trioxide to olefin of about 1.05:1. The product distribution obtained was about as follows: 46% sodium tridecene-1-sulfonate; 20% sodium 2-methoxy tridecane-1-sulfonate; 17% sodium 3- and 4-hydroxy tridecane-1-sulfonate; 14% sodium tridecene disulfonate; and the balance comprising sodium sulfate and sodium methyl sulfate.

Example VIII

A process similar to the process of Example I is run with the exception that a 1:1 mole ratio of sulfur trioxide to olefin is reacted at a temperature of about 50° F. Pressure at the top and bottom of the film reactor is about 14 p.s.i.g. and 9 p.s.i.g., respectively. 91% of the olefin is sulfonated. The resultant composition contains the following components and percentages: 48% sodium hexadecene-1-sulfonate, 36% sodium 2-methoxy hexadecane-1-sulfonate, 12% sodium 3- and 4-hydroxy hexadecane-1-sulfonate, and 4% sodium hexadecene disulfonate.

Example IX

Example I is again substantially repeated. This time a 1:1 mole ratio of sulfur trioxide to olefin is reacted at 100° F. for 35 seconds. 97% of the olefin is sulfonated. The final composition contains the following percentages of components: 46% sodium hexadecene-1-sulfonate, 34% sodium 2-methoxy hexadecane-1-sulfonate, 14% sodium 3- and 4-hydroxy hexadecane-1-sulfonate, 4% sodium hexadecene disulfonate and the balance sodium sulfate and sodium methyl sulfate.

Example X

When Example I is repeated using ethanol, n-propanol, isopropanol, n-butanol or isobutanol in place of the methanol on the same molar basis, substantially the same product distribution of sodium hexadecene-1-sulfonate, sodium 2-alkoxy hexadecane-1-sulfonate, sodium 3- and 4-hydroxy hexadecane-1-sulfonate and sodium hexadecene disulfonate is obtained.

The reaction products obtained according to the processes described and exemplified above are very useful as detergent compositions. They can be formulated readily into unbuilt, light-built, medium-built, and heavy-built detergent compositions. As used herein, built detergent formulations refers to those compositions containing a detergent and any of the many known builder compounds. Such builder compounds can be water-soluble inorganic alkaline builder salt, water-soluble organic alkaline builder salts, or mixtures thereof.

The lightly- and medium-built compositions are especially useful in dishwashing formulations and other compositions prepared specifically for hand laundering delicate fabrics such as silks, cottons, woolens, and others as well as synthetic textile materials such as nylon or the like.

The heavily-built formulations are especially useful for laundering heavily soiled fabrics. The built compositions discussed above can take the form of liquid compositions embodying also an aqueous vehicle, or solid compositions such as spray-dried granules, powders, flakes, and tablets.

What is claimed is:

1. A process for preparing a water-soluble sulfonated reaction product, comprising the steps of:
   (a) reacting an alpha-olefin containing from 10 to 20 carbon atoms with sulfur trioxide in a film reactor at a temperature of from 32° F. to 180° F., a pressure at the top of reactor of from 8 p.s.i.g. to 20 p.s.i.g., a reaction time of from 12 seconds to 50 seconds and wherein from 1.0 mole to 1.25 moles of the sulfur trioxide is reacted with each mole of the alpha-olefin to produce a sulfonated mix;
   (b) reacting about within 5 seconds the sulfonated mix of step (a) with a lower alcohol having from 1 to 4 carbon atoms;
   (c) neutralizing the product of step (b) with an alkali solution; and
   (d) hydrolyzing the product of step (c) to obtain the water-soluble sulfonated reaction product comprising the water-soluble salts of from 40% to 55% alkene-1-sulfonate, from 20% to 40% of 2-alkoxy alkane-1-sulfonate wherein the alkoxy radical contains from 1 to 4 carbon atoms, from 10% to 20% of 3- and 4-hydroxy alkane-1-sulfonate, and from 2% to 15% of alkene disulfonates, wherein the sulfonated chains all have from 10 to 20 carbon atoms.

2. The process of claim 1 wherein the sulfur trioxide is mixed with an inert gas in a volumetric ratio of inert gas to sulfur trioxide of from 10:1 to 100:1.

3. The process of claim 2 wherein the sulfur trioxide is uncomplexed.

4. The process of claim 2 wherein from 0.3 pound to 0.7 pound of sulfur trioxide is added for each pound of alpha-olefin per minute.

5. The process of claim 4 wherein the sulfonated mix of step (a) is reacted with the alcohol for from 5 minutes to 60 minutes at from 32° F. to 150° F.

6. The process of claim 5 wherein from 1.5 moles to 20 moles of alcohol is reacted with each mole of the sulfonated mix of step (a).

7. The process of claim 6 wherein the product of step (c) is hydrolyzed at a temperature of from 70° F. to 350° F. and a pressure of from atmospheric pressure to 120 p.s.i.g. for from 15 minutes to 72 hours.

8. The process of claim 7 wherein the alpha-olefin contains from 14 to 18 carbon atoms.

9. The process of claim 8 wherein the sulfonated mix of step (a) is reacted with a methyl alcohol or ethyl alcohol.

10. The process of claim 9 wherein from 1.1 to 1.2 moles of uncomplexed sulfur trioxide is reacted with each mole of the alpha-olefin.

11. The process of claim 10 wherein the sulfonation reaction of step (a) is carried out at a temperature of from 45° F. to 100° F. for from 15 seconds to 30 seconds.

References Cited

UNITED STATES PATENTS 3,346,629  10/1967  Broussalian _____ 260—327 S
3,595,906   7/1971  Nagayama et al. ____ 260—513

JOHN D. WELSH, Primary Examiner

U.S. Cl. X.R.

252—353, 554, 555; 260—504, 327 S